Figure 1:
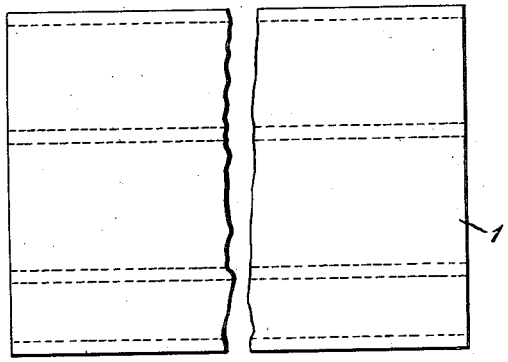

R. KEMP.
STRUCTURAL ELEMENTS.
APPLICATION FILED JAN. 25, 1919.

1,393,541. Patented Oct. 11, 1921.

WITNESSES:

INVENTOR
Robert Kemp.
BY
ATTORNEY

UNITED STATES PATENT OFFICE.

ROBERT KEMP, OF WASHINGTON, DISTRICT OF COLUMBIA, ASSIGNOR TO WESTINGHOUSE ELECTRIC & MANUFACTURING COMPANY, A CORPORATION OF PENNSYLVANIA.

STRUCTURAL ELEMENTS.

1,393,541.      Specification of Letters Patent.     Patented Oct. 11, 1921.

Original application filed May 26, 1916, Serial No. 99,995. Divided and this application filed January 25, 1919. Serial No. 273,075.

*To all whom it may concern:*

Be it known that I, ROBERT KEMP, a citizen of the United States, and a resident of Washington, D. C., have invented a new and useful Improvement in Structural Elements, of which the following is a specification, this being a division of application Serial No. 99,995, filed May 26, 1916.

My invention relates to structural elements and more particularly to structural elements adapted for airplane construction, and it has for its primary object the construction of such elements by employing a suitable fibrous material impregnated with a binder adapted to harden under the application of heat and pressure.

It is well known that many metals, when subjected to continuous vibrations or shocks, even though these vibrations and shocks be light, become crystallized and, consequently, materially weakened. It is also well known that wood (when continuously subjected to strain, vibrations and air friction, becomes weak, oftentimes will split and splinter and, in case of severe air resistance, will be deeply pitted so as to present an appearance of dry rot. In other words, the metal and wood soon become fatigued and are rendered practically useless. In view of this, one object of my invention is to construct structural elements of a material which is non-fatiguing and, consequently, of longer life than wood or metal when employed in airplane structures or in other structures where somewhat similar operating conditions exist.

Another object of my invention is to provide structural elements which will not be affected by moisture, wide temperature changes, oils, weak acids and alkalis.

Still another object of my invention is to construct structural elements which will acquire a high polish during the usual course of construction and which will consequently offer small skin resistance to air currents.

A further object of my invention is to provide structural elements which will insure great mechanical strength and be light in weight and substantially insoluble and infusible.

A still further object of my invention is to provide structural elements which may be constructed by workmen unskilled in the art without danger of destroying the inherent characteristics of durability and strength of the material.

With these and other objects in view, my invention will be more fully described, illustrated in the drawings, in the several views of which corresponding numerals indicate like parts, and then particularly pointed out in the claims.

Figure 2:
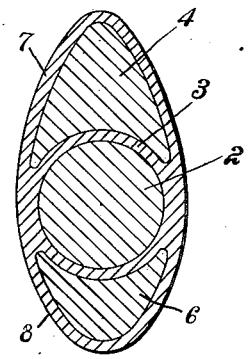
Figure 3:
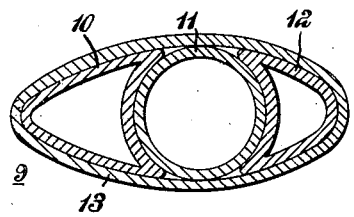
Figure 5:
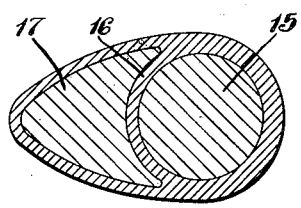
Figure 4:
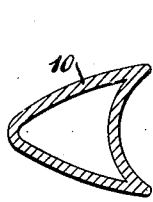
Figure 6:
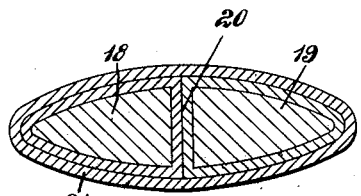
Figure 7:

In the drawings, Figure 1 is a side elevation, parts being broken away, of a structural element embodying my invention; Fig. 2 is a transverse, sectional view of the structural element shown in Fig. 1; Fig. 3 is a transverse, sectional view of another form of structural element which may be provided by my invention; Fig. 4 is a transverse, sectional view of an element employed in the construction of the strut or structural element shown in Fig. 3; Fig. 5 is a transverse, sectional view of a stream-line strut embodying my invention; Fig. 6 is a transverse, sectional view of another structural element illustrating another modification of my invention, and Fig. 7 is a transverse, sectional view of a cable stream-lined in accordance with my invention.

In practising my invention, I may employ a fibrous material and impregnate it with a suitable binder, after which the impregnated material may be dried to facilitate its handling. A structural element, such, for example, as a strut employed in airplane construction, may be constructed by selecting a suitable mandrel and superimposing thereon a plurality of layers of fibrous material impregnated with a binder until a suitable depth of material has been reached. Another mandrel, preferably of stream-line shape in cross-section, may then be disposed on the exterior of the superimposed layers of fibrous material and the winding of the material continued so as to inclose the added mandrel of stream-lined contour and the mandrel and material first employed, the resulting structure being substantially a tube having a trailing edge of stream-line contour. The body thus formed may then be disposed in a suitable mold and subjected to heat and pressure to compact the material and harden the binder to its insoluble and infusible state.

It is often desirable, particularly in airplane construction, that the wires, used as supporting elements, be stream-lined, and such wires may be stream-lined by following my invention in a manner similar to that above described. The wires or cables may serve as mandrels about which layers of fibrous material impregnated with a binder may be wound and a mandrel of stream-line shape in cross-section may be disposed upon the exterior of the windings and additional material may be superimposed in layers about the mandrel and cable, after which the body may be subjected to heat and pressure to compact the material and to harden the binder.

Wires and cables inclosed in this manner are protected from the weather and, by stream-lining them, the resistance they offer to air currents may be greatly decreased. An impregnated fibrous material employed in this manner offers distinct advantages, as it is difficult to stream-line wires or cables by fastening thereto metal or wood having a stream-line contour. Furthermore, the added weight of any stream-lining of metal or wood practically offsets the advantage obtained by the decreased air resistance. However, by employing fibrous material, the air resistance is greatly decreased, with but slight increase in weight of added material.

In order to insure a clear and accurate understanding of my invention, reference may be had to the drawings in which Fig. 1 is a side elevation of a structural element 1 embodying my invention. A structural element of this type may be constructed by employing a cylindrical mandrel 2 and superimposing thereon a plurality of layers of fibrous material, such as paper, duck, muslin or other suitable material impregnated with a binder such, for example, as a phenolic condensation product. The fibrous material may be impregnated with the phenolic condensation product in a liquid state and dried to facilitate its handling. When a suitable depth of material has been reached, as indicated at 3, another mandrel 4, of stream-line shape in cross-section, may be disposed upon the material inclosing the mandrel 2, and another mandrel 6 may be similarly disposed on the diametrically opposite side, after which the windings of material may be continued to inclose the mandrels 4 and 6 and the material upon the mandrel 2 until a suitable thickness of material has been disposed upon the mandrels 4 and 6, as indicated at 7 and 8. The body thus formed may then be placed in a suitable mold and subjected to heat and pressure to compact the material and to harden the binder.

Another form of structural element may be provided by my invention as shown in Fig. 3. In this instance, the interior of the body or structural element 9 comprises three sections or parts 10, 11 and 12 separately formed and assembled so that they may be inclosed by a tube 13. The structural element 9 may be constructed by forming each of the parts 10, 11 and 12 by superimposing layers of fibrous material, impregnated with a binder, about mandrels of suitable shape, indicated by openings in the finished parts from which the mandrels may be withdrawn after the superimposed layers of fibrous material have been subjected to heat and pressure in a mold. The parts, however, are preferably formed by superimposing layers of impregnated material about suitably shaped mandrels and then assembling and inclosing them with similar fibrous material wound to form the tube 13 which secures the several sections 10, 11 and 12 in place.

Another modification of my invention is shown in Fig. 5 and is probably the most common form of stream-lined strut employed in airplane construction. A strut of this type may be formed by superimposing impregnated fibrous material about a cylindrical mandrel 15 until a suitable thickness of material has been reached, as indicated at 16, after which a mandrel 17 of stream-line contour may be disposed on these superimposed layers of material and the winding of the material continued to inclose the mandrel 17 and the material 16. The entire structure may comprise a continuous sheet of material superimposed in layers to provide the desired depth of material. The body thus formed, when subjected to heat and pressure, is compacted into a solid and unitary body.

In Fig. 6 is shown another form of structural element which may be provided by my invention. In this instance, two mandrels 18 and 19 may be employed, each having one flat side, as indicated at 20, the other sides conforming to a stream-line shape. The mandrels may have impregnated material superimposed upon them after which they may be placed so that the material covering the straight sides engages. An inclosing tube 21 may be formed about the mandrels 18 and 19 with similar material and the body thus assembled may be subjected to heat and pressure to form a hard and unitary structure.

In Fig. 7 is illustrated a method by which cables or wires may be stream-lined in accordance with my invention. The cable or wires 22 may be stream-lined by forming material about them in the same manner as the strut, shown in Fig. 5, is formed. The wire or cable to be stream-lined replaces the first mandrel employed, and the mandrel imparting the stream-line trailing edge is applied in the same manner as described for forming the strut shown in Fig. 5.

As I have described a plurality of forms of structural elements which may be constructed in accordance with my invention, it will be apparent that, with minor changes, many structural elements of various other forms may be constructed in accordance therewith and I desire, therefore, that no limitations shall be imposed except such as are indicated in the appended claims.

I claim as my invention:

1. A method of making structural elements that comprises superimposing layers of fibrous material impregnated with a binder to form an elongate tubular body, disposing a mandrel of substantially stream-line shape in cross section upon the exterior of said layers, superimposing additional impregnated material about the tubular body and mandrel engaging it and subjecting the structure thus formed to heat and pressure in a mold.

2. A method of making structural elements that comprises superimposing layers of fibrous material impregnated with a binder to form an elongate tubular body, disposing a plurality of mandrels of substantially stream-line shape in cross section on the exterior of opposite sides of the tubular body, superimposing additional impregnated fibrous material about the structure thus formed and subjecting the assembled body to heat and pressure in a mold.

3. A method of making a stream-line strut that comprises forming an elongate tubular body of fibrous material impregnated with a phenolic condensation product, forming a plurality of tubes of similar material of substantially stream-line shape in cross-section, disposing the last mentioned tubes on opposite sides of the tubular body, winding sheet material impregnated with a phenolic condensation product about the assembled body and subjecting the structure thus formed to heat and pressure.

4. A method of making a stream-line strut that comprises forming a plurality of tubes of substantially stream-line shape in cross-section of fibrous material impregnated with a phenolic condensation product, disposing the tubes with their corresponding sides in opposite relation, winding a plurality of layers of similar material about the tubes and subjecting the body thus formed to heat and pressure in a mold.

5. A method of making structural elements that comprises forming a plurality of elongate tubular members of fibrous material impregnated with a binder, one of which is of substantially stream-line shape in cross section, and subjecting the bodies to heat and pressure to harden the binder and to form a unitary body of substantially stream-line shape in cross section.

In testimony whereof, I have hereunto subscribed my name this 9th day of January, 1919.

ROBERT KEMP.